(12) United States Patent
Lee

(10) Patent No.: US 7,793,004 B2
(45) Date of Patent: Sep. 7, 2010

(54) COMPUTER PERIPHERAL DEVICE IMPLEMENTED AS OPTIC STORAGE DEVICE OR/AND REMOVABLE DISK BY SOFTWARE EMULATION AND IMPLEMENTING METHOD THEREOF

(75) Inventor: Sang-Heon Lee, Seoul (KR)

(73) Assignee: CMOTech Co., Ltd., Seoul (KR)

( * ) Notice: Subject to any disclaimer, the term of this patent is extended or adjusted under 35 U.S.C. 154(b) by 0 days.

(21) Appl. No.: 12/525,701

(22) PCT Filed: Apr. 27, 2007

(86) PCT No.: PCT/KR2007/002091

§ 371 (c)(1),
(2), (4) Date: Aug. 4, 2009

(87) PCT Pub. No.: WO2008/096933

PCT Pub. Date: Aug. 14, 2008

(65) Prior Publication Data

US 2010/0030922 A1      Feb. 4, 2010

(30) Foreign Application Priority Data

Feb. 9, 2007      (KR) ...................... 10-2007-0013636

(51) Int. Cl.
G06F 3/00      (2006.01)
(52) U.S. Cl. ................... 710/2; 710/8; 710/62; 703/23; 703/24
(58) Field of Classification Search ....................... None
See application file for complete search history.

(56) References Cited

U.S. PATENT DOCUMENTS 5,915,106 A * 6/1999 Ard .............................. 703/23
6,393,493 B1 5/2002 Madden et al.
6,567,875 B1 5/2003 Williams et al.

(Continued)

FOREIGN PATENT DOCUMENTS

EP      1513057 A2      3/2005

(Continued)

OTHER PUBLICATIONS

Accessing Files on Emulated PC Disks at a Host Computer, Palmer CC, Nov. 1, 1985, IBM Technical Disclosure Bulletin, pp. 1-3.*

(Continued)

*Primary Examiner*—Eron J Sorrell
(74) *Attorney, Agent, or Firm*—Kevin P. Radigan, Esq.; Heslin Rothenberg Farley & Mesiti P.C.

(57) ABSTRACT

The present invention relates to a method of implementing an internal memory of a computer peripheral device as an optical storage device or/and a removable disk by software emulation. The computer peripheral device does not include additional hardware for driving the computer peripheral device as an optical storage device or/and a removable disk. A part of the internal memory of the computer peripheral device functions as a virtual optical storage device or/and a removable disk through software emulation. To achieve this, an emulation program is added to the computer peripheral device. The internal memory stores a program for recognizing the operating system and hardware type of a host as well as a device utilization application.

8 Claims, 9 Drawing Sheets

U.S. PATENT DOCUMENTS 7,496,493 B1 * 2/2009 Stevens .................. 703/24
2004/0153579 A1 * 8/2004 Shih et al. .................. 710/1

FOREIGN PATENT DOCUMENTS

| JP | 14073367 A | 3/2002 |
| KR | 1020010074360 A | 8/2001 |
| KR | 1020060067815 A | 6/2006 |

OTHER PUBLICATIONS

International Search Report for PCT/KR2007/002091 dated Nov. 7, 2007.

* cited by examiner

COMPUTER PERIPHERAL DEVICE IMPLEMENTED AS OPTIC STORAGE DEVICE OR/AND REMOVABLE DISK BY SOFTWARE EMULATION AND IMPLEMENTING METHOD THEREOF

CROSS REFERENCE TO RELATED APPLICATIONS

This application is a national stage filing under section 371 of International Application No. PCT/KR2007/002091, filed on Apr. 27, 2007, and published in English on Aug. 14, 2008, as WO 2008/096933 A1, and which claims priority of Korean application No. 10-2007-0013636, filed on Feb. 9, 2007, the entire disclosure of these applications being hereby incorporated herein by reference.

TECHNICAL FIELD

The present invention relates to an apparatus and method for adding an optical storage device or a removable disk as a mass storage device to a host computer.

BACKGROUND ART

Conventional technical solutions to produce an optical storage device or a removable disk provide hardware having an additional memory. That is, when a host computer requires an optical storage device such as CDROM and DVDROM or a removable disk, hardware is added to the host computer.

FIG. 8 illustrates a connection of an optical storage device 3 (or a removable disk) to a host 1. Referring to FIG. 8, the optical storage device 3 is connected to the host 1 through a separate logical standard interface 5 irrespective of a computer peripheral device 2 connected to the host 1 through a standard interface 4. The optical storage device 3 includes a controller and an internal memory for reading an optical storage medium such as a CDROM and connecting the optical storage medium to the host 1. While the computer peripheral device 2 and the optical storage device 3 can be placed in a single case, they are physically separated from each other as different hardware devices.

FIG. 9 illustrates a connection of a USB modem 2' as a computer peripheral device and an external CDROM 3' to a host 1' through USB interfaces 4' and 5'. The USB modem 2' and the external CDROM 3' respectively include controllers and memories. Although the USB modem 2' and the external CDROM 3' are housed in a single case, they are completely independent from each other as different hardware devices.

Accordingly, to add an optical disk function to the host using a computer peripheral device, a disk controller, an additional memory and a peripheral device such as HUB must be all connected to the host. This increases the cost due to additional hardware. The computer peripheral device can be used as an optical storage medium using a dedicated driving chip. However, this method increases the cost because of the dedicated driving chip.

To execute a specific application program (or a driver) for a computer peripheral device, which is stored in an optical storage device such as CD or DVD, it is required to insert the optical storage device into a computer and install the specific application program.

The computer peripheral device is connected to the host to be used so that the hardware type or operating system of the host largely affects the operation of the computer peripheral device. Thus, when an application program (or a driver) for utilizing the computer peripheral device is not suitable for the hardware type or operating system of the host, the computer peripheral device cannot be used. Accordingly, a user must confirm whether the application program of the computer peripheral device is suitable for the hardware type or operating system of the host, which is difficult for a user who is not expert.

DISCLOSURE OF INVENTION

Accordingly, the present invention has been made to solve the above-mentioned problems occurring in the conventional art, and a primary object of the present invention is to provide an apparatus and method for additionally providing an optical storage device or/and a removable disk without adding additional hardware to a computer peripheral device.

According to the apparatus and method, the computer peripheral device functions as an optical storage device or/and a removable disk so that the computer peripheral device can be efficiently used and economical effect can be achieved.

Another object of the present invention is to make a host recognize an internal memory of a computer peripheral device as an optical storage device and automatically execute a specific application program stored in the internal memory to improve the convenience of users.

Yet another object of the present invention is to make a computer peripheral device automatically recognize the operating system or hardware type of a host when the computer peripheral device is connected to the host and install a driver suitable for the operating system or hardware type of the host.

To accomplish the objects of the present invention, there is provided a computer peripheral device comprising: a standard interface module for connecting the computer peripheral device to a host; a processor for executing a basic function of the computer peripheral device in the host, implementing an internal memory of the computer peripheral device as a virtual optical storage device connected to the host by emulation, and processing a command specified by a standard of an optical storage device, which is transmitted from the host; an application device for executing the basic function; and the internal memory in which a file system for executing an optical storage device function is constructed, the internal memory having an optical storage device region for storing a device recognition application for the emulation and a driver for driving the computer peripheral device. The device recognition application is driven to implement the internal memory as the optical storage device by emulation and the driver is automatically installed when the computer peripheral device is connected to the host so that an additional optical storage device for driving the computer peripheral device is not required.

The internal memory may include a removable disk region in which a file system for executing a removable disk function is constructed, and the internal memory may include a second device recognition application in order to carry out the removable disk function.

The optical storage device region may include a host recognition application that judges the operating system and hardware type of the host when the computer peripheral device is connected to the host.

The standard interface module may correspond to one of USB, PCMCIA, ExpressCard, PCI Express and IEEE1394 interface modules.

The application device may correspond to one of a wired/wireless modem, a scanner, a printer, a camera, a keyboard, a mouse and a fingerprint sensor.

To accomplish the objects of the present invention, there is also provided a method of implementing a computer peripheral device as an optical storage device, comprising: a step of connecting the computer peripheral device to a host through a standard interface module; a step in which the host inquires the type of the computer peripheral device and the computer peripheral device responds to the host as an optical storage device using a device recognition application; a step in which the host recognizes an internal memory of the computer peripheral device as the optical storage device, reads and executes an installation program stored in the internal memory; a step in which the computer peripheral device judges the type of the host; and a step of installing a driver and required software previously stored in the internal memory according to the judgment result.

The method may further comprise: a step in which the computer peripheral device informs the host that a part of the internal memory functions as a removable disk using a second device recognition application when the host inquires the type of the computer peripheral device; and a step in which the host recognizes the part of the internal memory as a removable disk and reads/writes data from/to the removable disk.

DESCRIPTION OF DRAWINGS

Further objects and advantages of the invention can be more fully understood from the following detailed description taken in conjunction with the accompanying drawings, in which.

BEST MODE

Figure 1:
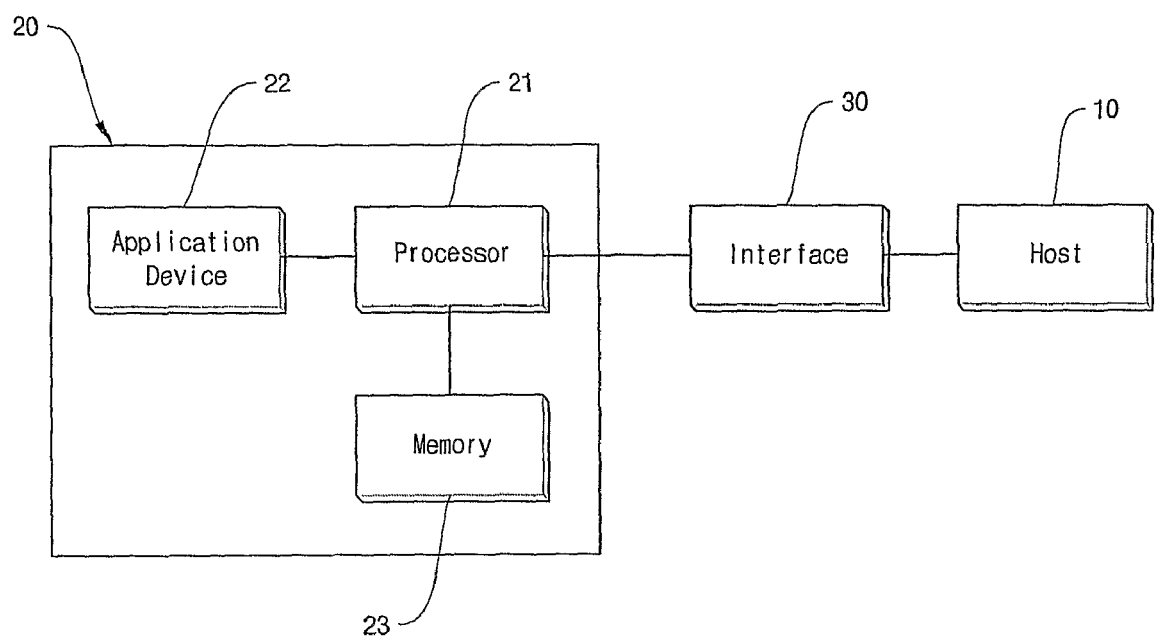
FIG. 1 illustrates a configuration of a computer peripheral device according to the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

FIG. 1 illustrates a configuration of a computer peripheral device 20 according to an embodiment of the present invention. Referring to FIG. 1, the computer peripheral device 20 includes a processor 21, a memory 23, an application device 22 and a standard interface module (not shown) and is connected to a host computer 10 through a standard interface 30. The processor 21 executes a basic function of the computer peripheral device 20 and the memory 23 stores a program and data required for the processor 21 to execute the basic function of the computer peripheral device 20. The standard interface module (not shown) that carries out data communication between the host 10 and the computer peripheral device 20 conforms to an interface standard included in the host 10 and the computer peripheral device 20. The standard interface module can be one of USB, PCMCIA, ExpressCard, PCI Express and IEEE1394 interface modules, which transmit and receive information according to a protocol designated by corresponding interface standards.

The computer peripheral device 20 includes various peripheral devices having a memory storing a program and data. For example, the computer peripheral device 20 can be a modem, a scanner, a printer, a camera, a keyboard or a mouse connected with a host. Furthermore, the computer peripheral device 20 can be a multi-function peripheral device having at least two functions. Moreover, the computer peripheral device 20 can be a fingerprint sensor including a built-in semiconductor chip, which is connected to the host 10 and reinforces the security of the host 10. The computer peripheral device 20 includes the internal memory 23 storing a program and data required to execute the basic function (modem, scanner, printer, camera, keyboard, mouse or fingerprint recognition function). The application device 22 performs the basic function of the computer peripheral device 20. Computer peripheral devices of different types have different application devices.

The internal memory 23 stores a program and data required for the computer peripheral device 20 to function as an optical storage device or/and a removable disk according to the present invention in addition to the program and data required to execute the basic function of the computer peripheral device 20.

Figure 2:
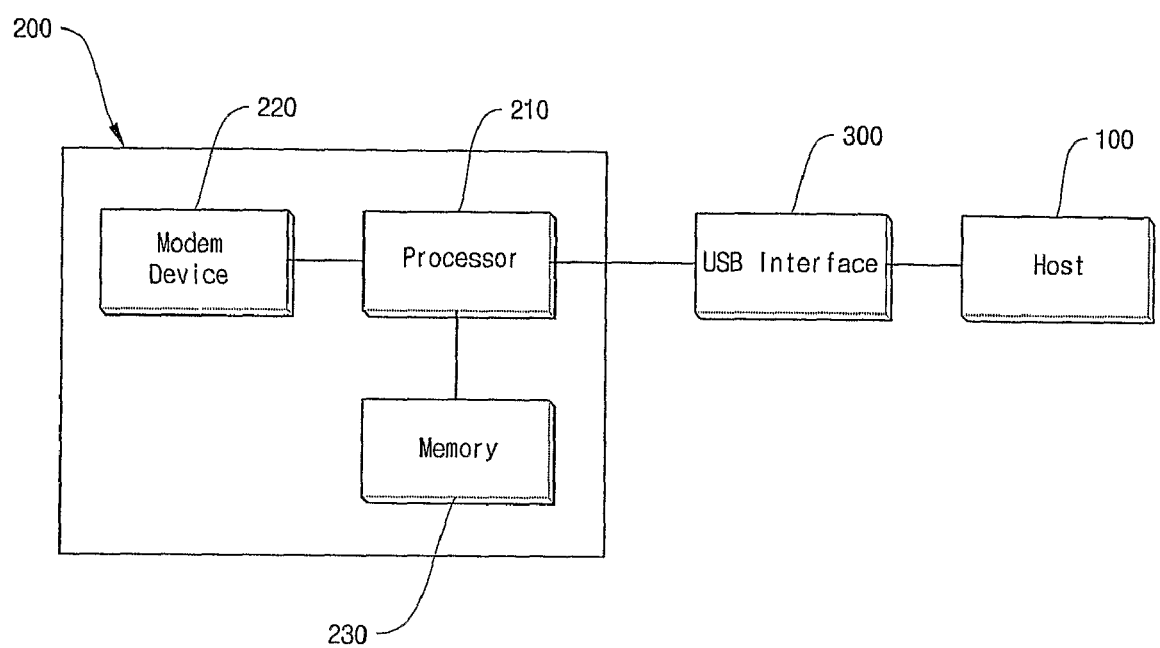
FIG. 2 illustrates a configuration of a USB modem as a computer peripheral device according to the present invention.

FIG. 2 illustrates a configuration of a USB modem 200 as a computer peripheral device according to an embodiment of the present invention. The USB modem 200 functions as a CDROM or a DVDROM as well as a modem. Referring to FIG. 2, the USB modem 200 is connected to a host 100 through a USB standard interface 300 and includes an interface module for performing data communication using the USB standard interface 300. An internal memory 230 of the USB modem 200 is logically divided into a storage space for a modem function and a storage space for an optical disk function. The former stores a program and data required to perform the modem function and the latter stores a device recognition application program for emulating an optical disk, an application program for recognizing the host and a device utilization program. The device utilization application program includes a driver for driving the USB modem 200.

A processor 210 included in the USB modem 200 transmits information about the modem device 220 and information about the memory 230 as an optical storage device to the host 100. The host 100 recognizes a part of the internal memory 230 of the USB modem 200 as an optical storage device using the device recognition application program stored in the internal memory 230 and executes commands specified by the standard of the optical storage device. In addition the host 100 reads the device utilization application program stored in the internal memory 230 of the USB modem 200 and automatically executes the application program into the host according to a predetermined process.

Accordingly, the USB modem 200 is recognized as two hardware devices by the host 100 while it is a single hardware device because the USB modem 200 functions as an optical storage device as well as a modem.

The internal memory 23 storing the program and data required to execute the basic function of the computer peripheral device 20 and functioning as an additional storage device can be selected properly from a group consisting of a nonvolatile memory such as PROM (Programmable Read Only Memory), EPROM (Erasable Programmable ROM) and flash memory, and a volatile memory such as DRAM (Dynamic Random Access Memory), SRAM (Static RAM), VRAM (Video RAM), SDRAM (Synchronous Dynamic RAM) and DDRSDRAM (Double Data Rate SDRAM).

Figure 3:
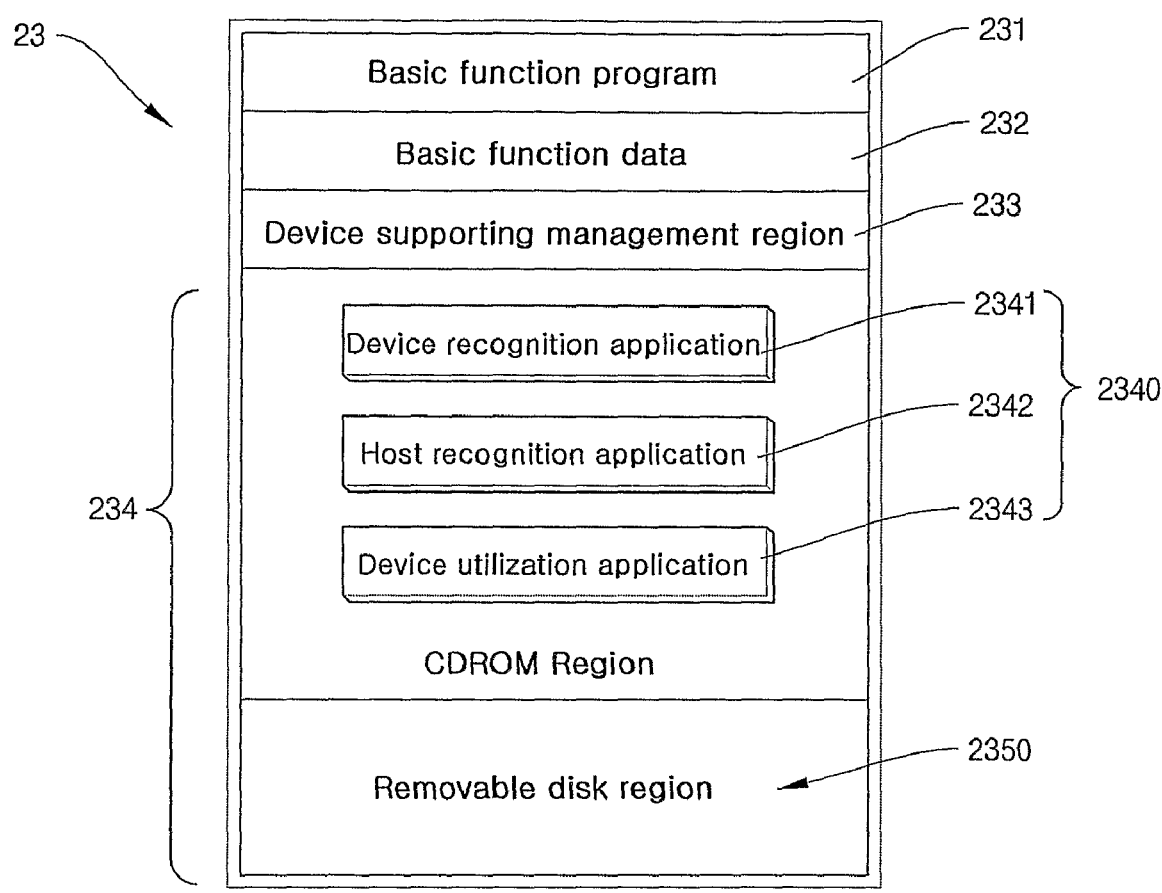
FIG. 3 illustrates a logical configuration of an internal memory of the computer peripheral device according to the present invention.

FIG. 3 illustrates a logical configuration of the internal memory 23 of the computer peripheral device 20 illustrated in FIG. 1 according to the present invention. The internal memory 23 includes a basic function program region 231 storing a basic function program required to execute the basic function of the computer peripheral device 20, a basic function data region 232 storing data of the basic function, a device supporting management region 233 and a device supporting storage region 234.

The basic function program region 231 and the basic function data region 232 are ROM regions provided to perform the basic function of the computer peripheral device 20 and the device supporting management region 233 and the device supporting storage region 234 serve as a storage. That is, the part of the internal memory 23 other than the region in which the program and data required to perform the basic function are stored is provided as the device supporting management region 233 and the device supporting storage region 234. A file system suitable to provide a storage device function is constructed in the part of the internal memory 23.

The device supporting management region 233 stores information about a storage space and the device supporting storage region 234 is divided into an optical storage device region 2340 and a removable disk region 2350. The optical storage device region 2340 stores a device recognition application program 2341 by which the host recognizes the computer peripheral device as an optical storage device and a device utilization application program 2343 read by the host and automatically executed. The device recognition program 2341 makes a part of the memory 23 of the computer peripheral device 20 function as a virtual optical storage device through software emulation. To achieve this, a program required for emulation, for example, a program corresponding to a standard function required for a CD drive of the host 10 to recognize the internal memory 23 of the computer peripheral device 20 as a CDROM is added to the computer peripheral device 20. That is, the computer peripheral device 20 can function as an optical storage device without having an additional hardware added thereto according to the present invention.

The computer peripheral device 20 sends device information to the host 10 to inform the host 10 of the type and function of the computer peripheral device 20 when the computer peripheral device 20 is connected to the host 10. The processor 21 of the computer peripheral device 20 constructs the file system in the remaining part of the internal memory 23 and processes a storage device standard command transmitted from the host, such as a read command. The transmission of commands, data and status between the host and the optical storage device and the device standard command required for the transmission are previously set as a protocol through the standard interface. Accordingly, the processor 21 of the computer peripheral device 20 provides device information about the internal memory 23 of the computer peripheral device 20 to the host 10 and informs the host 10 that the optical storage device region (readable memory region) 2340 corresponds to the optical storage device. Then, the processor 21 processes a command transmitted from the host 10 that recognizes the readable memory region 2340 as an optical storage device using a previously set process.

The device utilization application program may be a driver required to drive the computer peripheral device 20. In this case, the internal memory 23 of the computer peripheral device 20 is used to install the driver, and thus the optical storage device region 2340 is provided as a read-only memory region.

Furthermore, the optical storage device region 2340 stores a host recognition application 2342 that recognizes the operating system and hardware type of the host, judges the operating system and hardware type of the host and executes an installation program suitable for the operating system and hardware type of the host.

Figure 4:
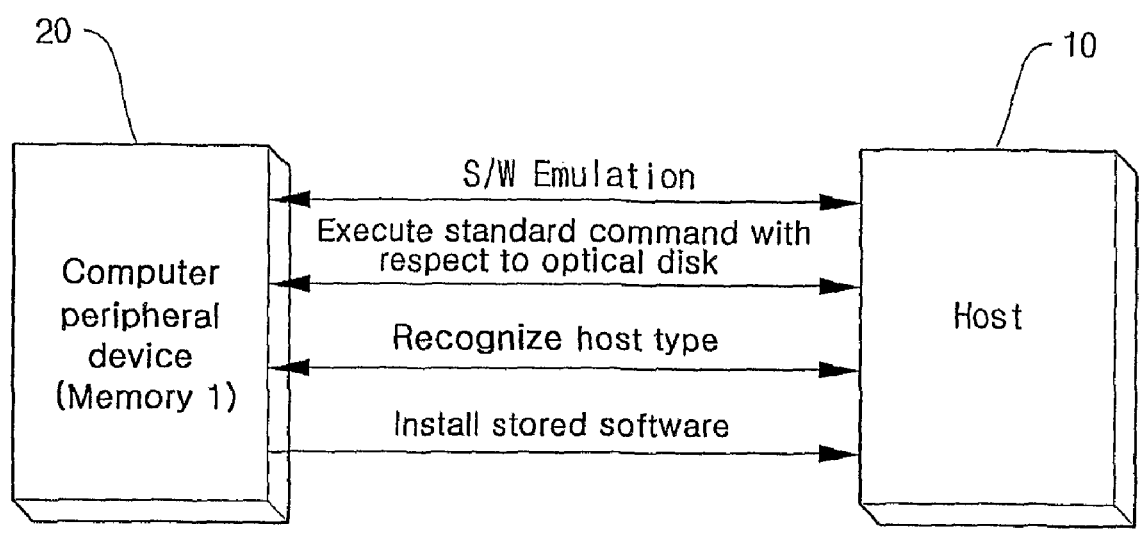
FIG. 4 illustrates the mutual relation of a computer peripheral device emulating an optical storage device according to the present invention and a host.

FIG. 4 illustrates the function of the optical storage device region 2340 and the principle of the present invention. The present invention is much superior to a conventional technique that requires additional hardware storing an installation drive in terms of the cost and operation efficiency.

Figure 5:
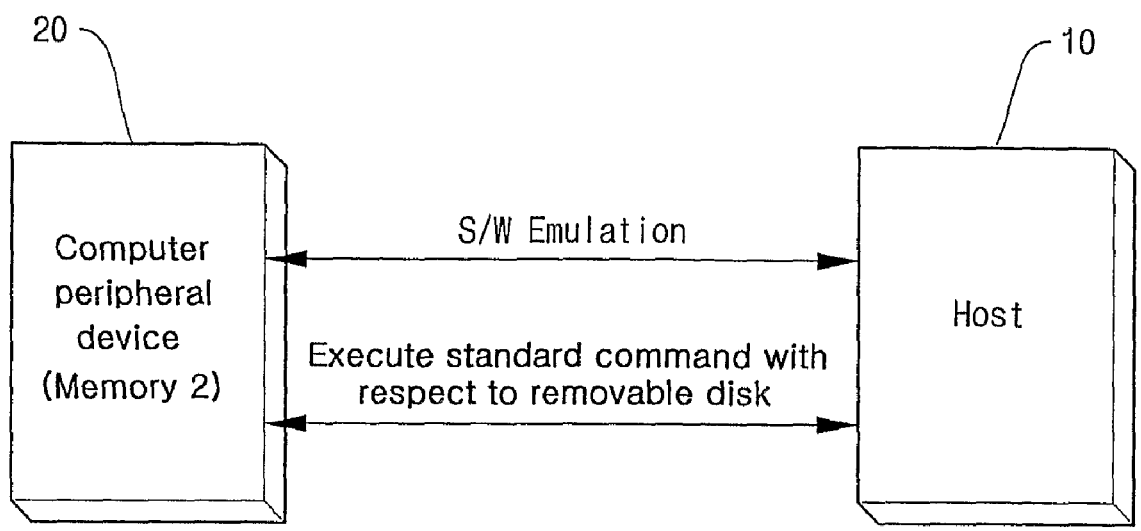
FIG. 5 illustrates the mutual relation of a computer peripheral device emulating a removable disk according to the present invention and a host.

The removable disk region 2350 included in the device supporting storage region 234 functions as a removable disk. To achieve this, an emulating means such as the device recognition application 2341 of the optical storage device region 2340 is required. When the processor of the computer peripheral device provides device information about the internal memory 23 of the computer peripheral device to the host and informs the host that the part 2350 of the internal memory 23 corresponds to a removable disk, the host recognizes it and executes a standard command with respect to the removable disk. The removable disk region 2350 can be read and written. FIG. 5 illustrates a function of using a part of the internal memory of the computer peripheral device as a removable disk.

Figure 6:
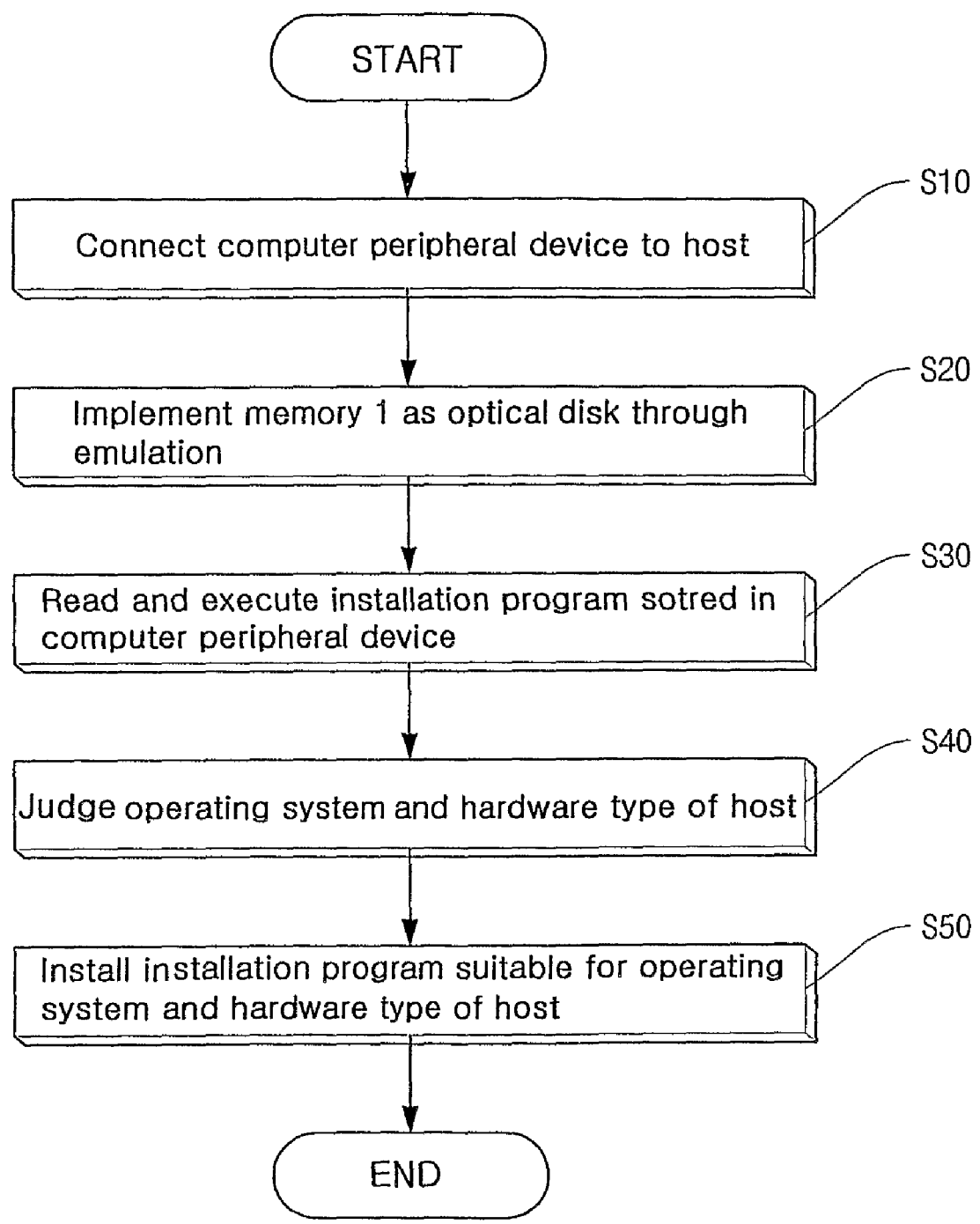
FIG. 6 is a flow chart illustrating a process of implementing a computer peripheral device according to an embodiment of the present invention.

FIG. 6 is a flow chart illustrating a process of using a part of an internal memory of a computer peripheral device as an optical storage device according to an embodiment of the present invention.

The internal memory of the computer peripheral device stores a program and data required for a processor to execute a basic function. A file system including an optical storage device region and a removable disk region is constructed in the remaining part of the internal memory other than the region storing the program and data. A means for emulation, a means for recognizing the operating system and hardware type of a host and a driver for driving the computer peripheral device are stored in the file system.

Then, the computer peripheral device is connected to the host through a standard interface module in step S10. When initial power is applied to the computer peripheral device, the host inquires the type of the computer peripheral device and the computer peripheral device informs the host of the type of the computer peripheral device as an optical storage device in step S20. This corresponds to a software emulation step in which a part of the internal memory of the computer peripheral device emulates an optical storage device using a previously stored device recognition application program. When the host recognizes the internal memory of the computer peripheral device as the optical storage device, the host reads and executes an installation program stored in the internal memory recognized as the optical storage device in step S30. A device utilization application program stored in the internal memory sets a function for automatic execution of the host.

That is, the host automatically executes a specific program in an optical disk when initially reading the optical disk. In the same manner, the host automatically executes a specific operation like a trigger when it is connected with the computer peripheral device. This is similar to the case that music is automatically played when a music CDROM is loaded in a computer.

Here, a program module for recognizing the host is executed first and the operating system and hardware type of the host are judged in step S40. Then, an installation program suitable for the operating system and hardware type of the host is executed in step S50.

The installation program installs a driver and software to perform the basic operation of the computer peripheral device. The driver and software carry out an operation required to control and use the computer peripheral device. That is, the driver and software execute the basic function of the computer peripheral device.

In the embodiment illustrated in FIG. 6, a part of the internal memory of the computer peripheral device emulates the optical storage unit such as a CDROM or DVDROM, and the host reads and executes the driver previously stored in the internal memory. That is, the computer peripheral device can be used as an optical storage device when connected to the host without requiring an additional optical storage medium such as a CDROM for driving the computer peripheral device. However, the host only reads the internal memory of the computer peripheral device so that utilization of the internal memory is limited.

Figure 7:
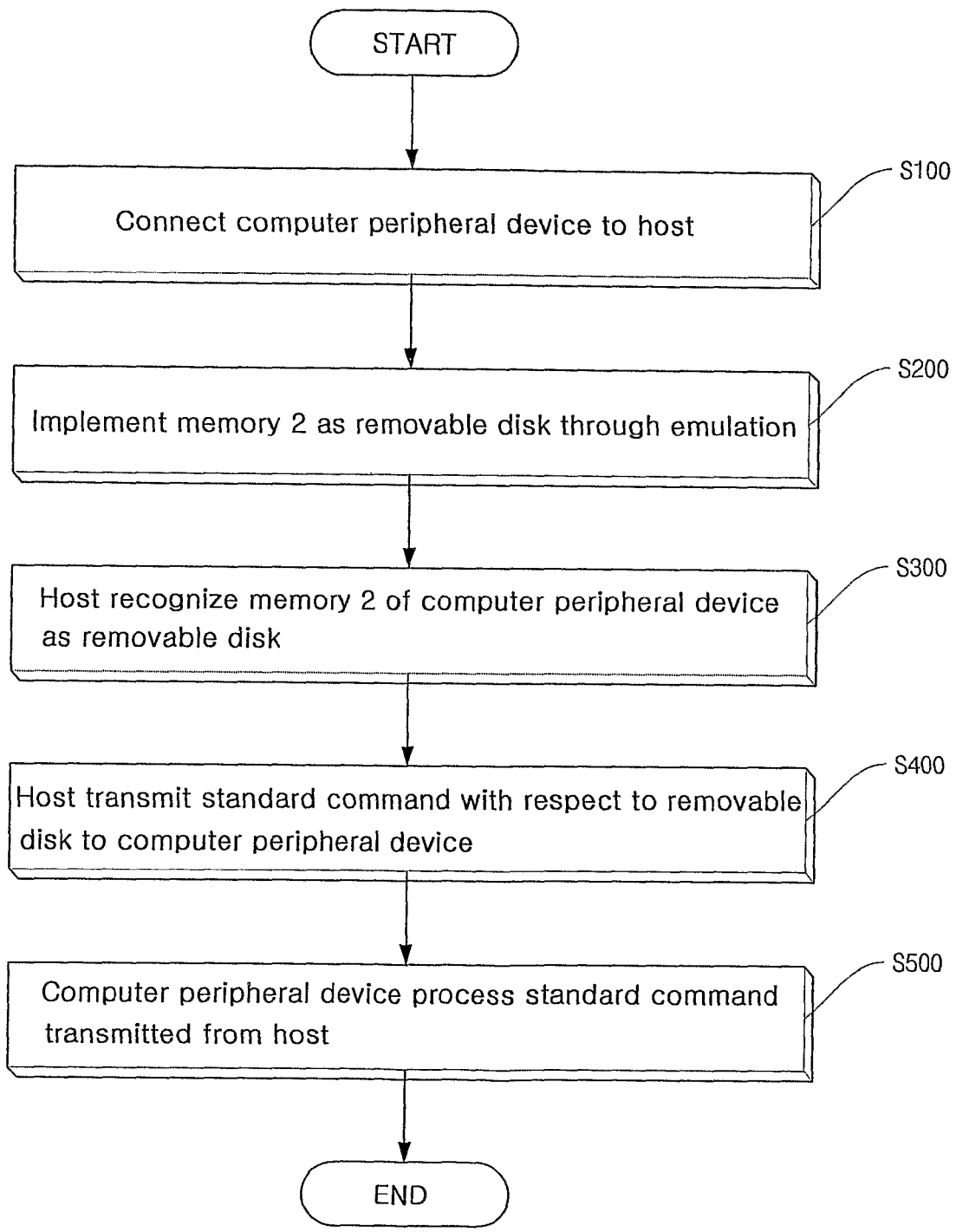
FIG. 7 is a flow chart illustrating a process of implementing a computer peripheral device according to another embodiment of the present invention.
Figure 8:
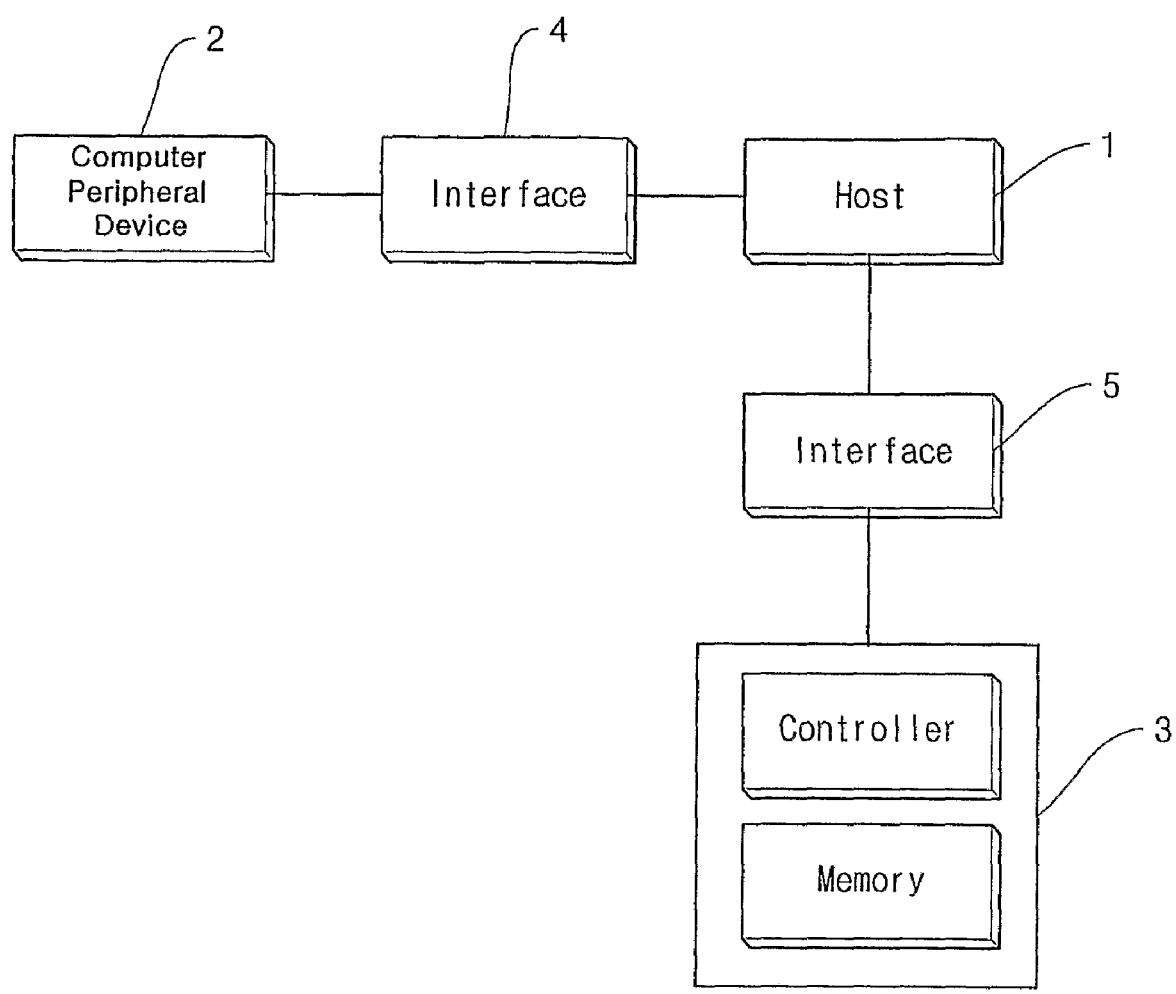
FIG. 8 illustrates a connection of an optical storage device to a host according to a prior art.
Figure 9:
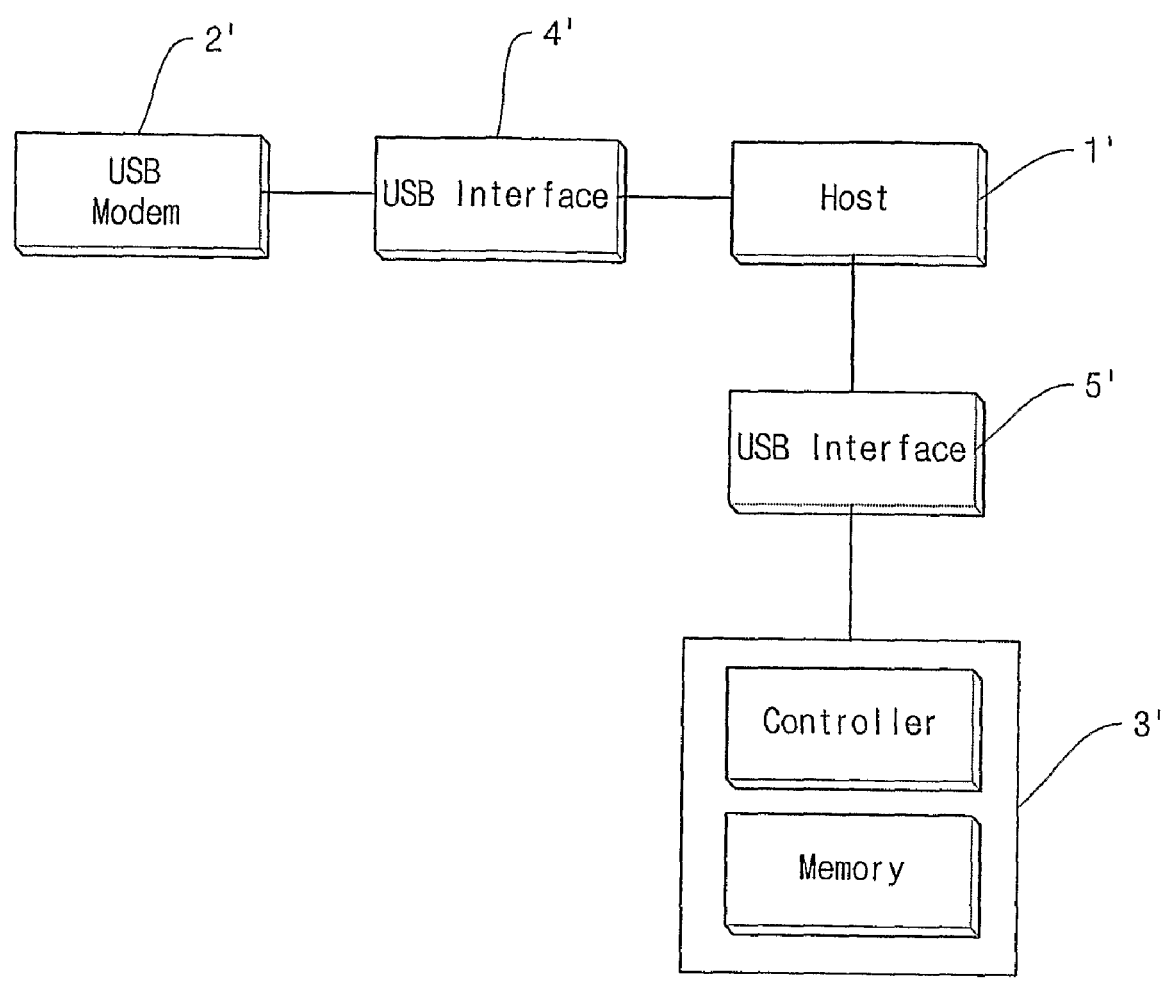
FIG. 9 illustrates a connection of a computer peripheral device and an optical storage device to a host according to a prior art.

In an embodiment illustrated in FIG. 7, a readable and writable function is added to the internal memory of the computer peripheral device. To achieve this, a part of the internal memory emulates a removable disk. When the host is connected to the computer peripheral device in step S100, the host inquires the type of the computer peripheral device and the computer peripheral device informs the host that a part of the internal memory is a removable disk using an additional device recognition application in step S200. When the computer peripheral device is connected to the host, an operation required for the basic function of the computer peripheral device is performed, the device supporting management region of the internal memory of the computer peripheral device is confirmed, and an initial operation for supporting a mass storage device function, that is, an operation of confirming and storing the contents and state of a removable disk, is executed. Then, the internal memory of the computer peripheral device emulates the removable disk according to a predetermined process, that is, a process of using the internal memory as a removable disk.

Subsequently, device information of the computer peripheral device is transmitted to the host. Specifically, device information about an application device with respect to the basic function of the computer peripheral device and device information about the removable disk corresponding to a part of the internal memory of the computer peripheral device are transmitted to the host. Accordingly, the host recognizes the internal memory of the computer peripheral device as the removable disk in step S300 and transmits a standard command with respect to the removable disk, which is specified by standards of mass storage devices, to the computer peripheral device in step S400.

The processor of the computer peripheral device processes the standard command in step S500. Accordingly, the host reads and writes data through the removable disk region of the internal memory of the computer peripheral device.

According to the present invention, an optical storage device can be additionally provided without adding hardware to the computer peripheral device. That is, the computer peripheral device is driven without using an additional optical storage medium such as a CDROM because the host recognizes the internal memory of the computer peripheral device as an optical storage device and automatically executes an installation program stored in the internal memory. Furthermore, the computer peripheral device can be easily used as an optical storage device when just connected to the host.

Moreover, the computer peripheral device can automatically recognize the operating system or hardware type of the host when connected to the host and install a driver suitable for the operating system or hardware type of the host. This is convenient for a user to use the computer peripheral device.

Furthermore, a part of the internal memory of the computer peripheral device can be used to install the driver and the remaining part of the internal memory can be used as a readable/writable removable disk so that the computer peripheral device can be efficiently used.

While the present invention has been particularly shown and described with reference to exemplary embodiments thereof, it will understood by those of ordinary skill in the art that various changes in form and details may be made therein without departing from the spirit and scope of the present invention as defined by the following claims.

The invention claimed is:

1. A computer peripheral device comprising:
   a standard interface module for connecting the computer peripheral device to a host;
   a processor for executing a basic function of the computer peripheral device, implementing an internal memory of the computer peripheral device as a virtual optical storage device connected to the host by emulation, and processing a command specified by a standard of an optical storage device, which is transmitted from the host;
   an application device for performing the basic function; and
   the internal memory in which a file system for executing an optical storage device function is constructed, the internal memory having an optical storage device region for storing a device recognition application for the emulation and a driver for driving the computer peripheral device,
   wherein the device recognition application is driven to implement the internal memory as the optical storage device by emulation and the driver is automatically installed when the computer peripheral device is connected to the host so that an additional optical storage device for driving the computer peripheral device is not required.

2. The computer peripheral device according to claim 1, wherein the internal memory includes a removable disk region in which a file system for executing a removable disk function is constructed, and the internal memory includes a second device recognition application in order to carry out the removable disk function.

3. The computer peripheral device according to claim 1, wherein the optical storage device region includes a host recognition application that judges the operating system and hardware type of the host when the computer peripheral device is connected to the host.

4. The computer peripheral device according to claim 1, wherein the standard interface module corresponds to anyone of a USB, PCMCIA, ExpressCard, PCI Express or IEEE1394 interface module.

5. The computer peripheral device according to claim 1, wherein the application device corresponds to anyone of a wired/wireless modem, a scanner, a printer, a camera, a keyboard, a mouse or a fingerprint sensor.

6. A method of implementing a computer peripheral device as an optical storage device, comprising:
  connecting the computer peripheral device to a host through a standard interface module, and wherein the computer peripheral device corresponds to anyone of a wired/wireless modem, a scanner, a printer, a camera, a keyboard, a mouse or a fingerprint sensor;
  inquiring by the host the type of the computer peripheral device, and wherein the computer peripheral device responds to the host as an optical storage device using a device recognition application;
  recognizing by the host an internal memory of the computer peripheral device as the optical storage device, and reading and executing an installation program stored in the internal memory;
  judging by the computer peripheral device the type of host; and
  installing a driver and required software previously stored in the internal memory according to the judgment result.

7. The method according to claim 6, further comprising:
  informing by the computer peripheral device the host that a part of the internal memory functions as a removable disk using a second device recognition application when the host inquires the type of the computer peripheral device; and
  recognizing by the host the part of the internal memory as a removable disk and reading or writing data from/to the removable disk.

8. The method according to claim 6, wherein the standard interface module corresponds to anyone of a USB, PCMCIA, ExpressCard, PCI Express or IEEE1394 interface module.

* * * * *